United States Patent
Klassen

(10) Patent No.: US 8,654,375 B2
(45) Date of Patent: Feb. 18, 2014

(54) RESOURCE PARTITIONING IN A PRINT SYSTEM

(75) Inventor: R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 561 days.

(21) Appl. No.: 12/467,369

(22) Filed: May 18, 2009

(65) Prior Publication Data

US 2010/0290080 A1    Nov. 18, 2010

(51) Int. Cl.
    *G06F 3/12*    (2006.01)
(52) U.S. Cl.
    USPC .......... 358/1.15; 358/1.4; 358/1.13; 358/1.16
(58) Field of Classification Search
    USPC ............. 358/1.13, 1.14, 1.15, 1.16, 1.17, 1.4, 358/1.9, 1.18
    See application file for complete search history.

(56) References Cited

U.S. PATENT DOCUMENTS

| | | | |
|---|---|---|---|
| 5,619,624 A * | 4/1997 | Schoenzeit et al. | 345/418 |
| 5,774,356 A * | 6/1998 | Hisatake et al. | 700/28 |
| 6,600,569 B1 * | 7/2003 | Osada et al. | 358/1.12 |
| 6,657,741 B1 | 12/2003 | Barry | |
| 6,973,286 B2 | 12/2005 | Mandel | |
| 7,161,705 B2 | 1/2007 | Klassen | |
| 7,342,686 B2 | 3/2008 | Barry et al. | |
| 2004/0196496 A1 | 10/2004 | Klassen | |
| 2004/0196497 A1 | 10/2004 | Klassen | |
| 2004/0196498 A1 | 10/2004 | Klassen | |
| 2004/0197124 A1 | 10/2004 | Klassen | |
| 2005/0099649 A1 * | 5/2005 | Ferlitsch et al. | 358/1.15 |
| 2009/0091774 A1 * | 4/2009 | Burkes et al. | 358/1.13 |

* cited by examiner

*Primary Examiner* — Vu B Hang
(74) *Attorney, Agent, or Firm* — Fay Sharpe LLP

(57) ABSTRACT

A printing system is provided comprising a plurality of resources including idle and non-idle resources having a plurality of image marking engines and a user interface for inputting user determinable priority criteria for a first print job. All of the non-idle resources are assigned to the first print job when the first print job is the only print job; and, a resource fraction of the non-idle resources is assigned to the first print job when there is at least a second print job.

15 Claims, 1 Drawing Sheet

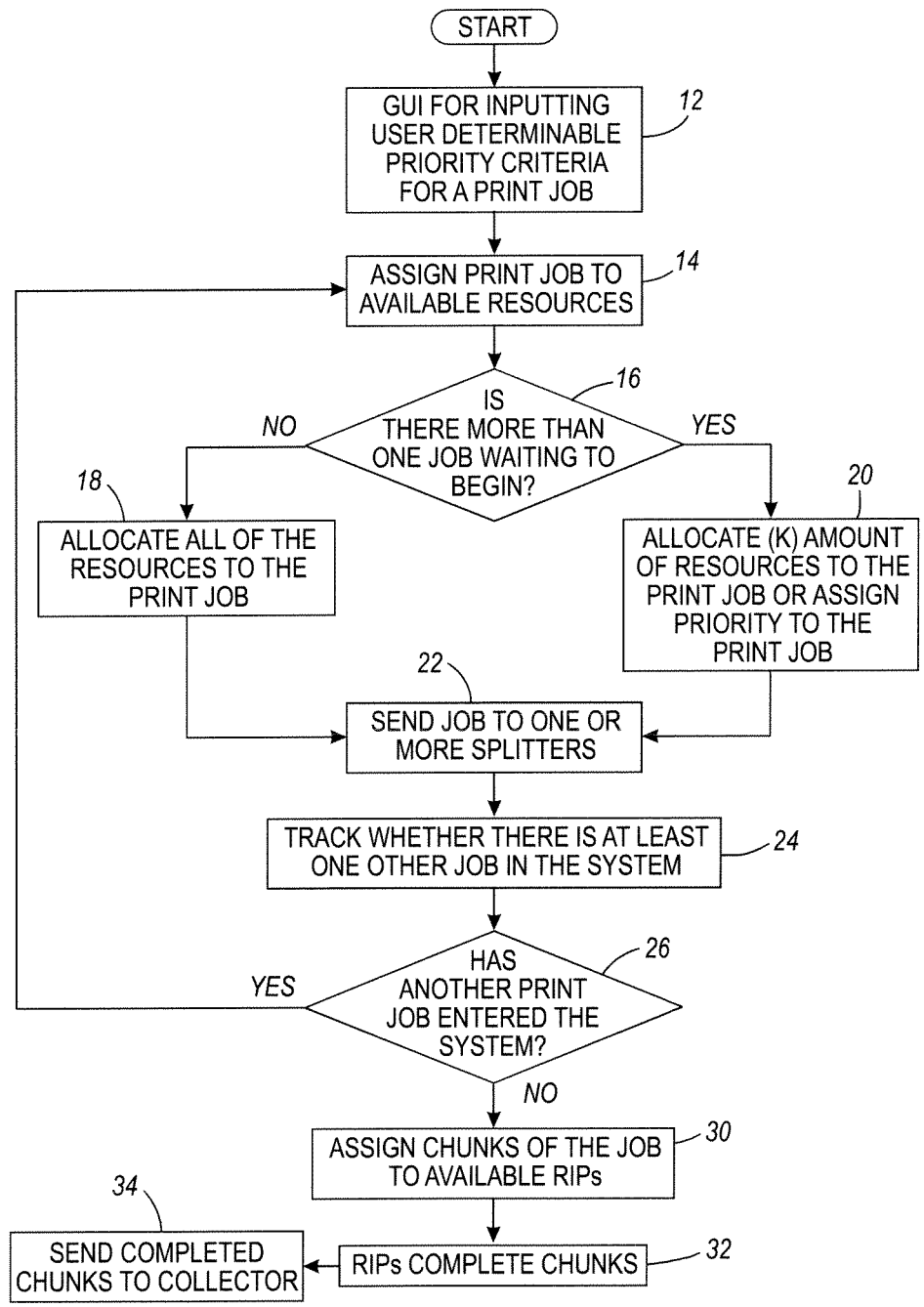

RESOURCE PARTITIONING IN A PRINT SYSTEM

BACKGROUND

For typical print job processing, when a user has a very long print job, and several short print jobs, once the long job is submitted; all raster image processing (RIP) resources are consumed by long job, until the long job is complete. The several short jobs are left queued, but could easily have RIPped and printed during the time that the long job was RIPped, with minimal impact on the RIP time or print time of the long job. Since the short jobs may arrive after the long job is already being processed, the user or operator is prohibited from re-ordering or re-prioritizing jobs to ensure that long jobs run when there are no short jobs. One mechanism already available is an "interrupt job" mechanism, wherein the operator can hold all jobs not yet in RIP, suspend the job currently RIPping, and then release any short jobs. This is an all-or-nothing approach requiring excessive manual intervention. Furthermore, no provision is currently made for driving multiple independent jobs to separate printers.

Published US patent application number 20040196496 describes a page or "chunk" parallel printing system. The system comprises a printer, a plurality of processing nodes, each processing node being disposed for processing a portion of a print job into a printer dependant format, and a processing manager for spooling the print job into selectively sized chunks and assigning the chunks to selected ones of the nodes for parallel processing of the chunks by the processing nodes into the printer dependant format. The chunks are selectively sized from at least one page to an entire size of the print job in accordance with predetermined splitting factors for enhancing page processing efficiency. The system further comprises a supervisor processor for estimating the work time required to process a chunk based upon selected data determined from the splitting of the print job and for load balancing the print jobs across the processing nodes. Further background information for the present disclosure can be found in US patent publication number 20040197124 describing an idiom recognizing document splitter; US patent publication number 20040196498 describing a parallel printing system having modes for auto-recovery, auto-discovery of resources, and parallel processing of unprotected postscript jobs; and, US patent publication number 20040196497 describing a parallel printing system having flow control in a virtual disk transfer system. Patent publications 20040196496, 20040197124, 20040196498, and 20040196497 are incorporated by reference as background information.

SUMMARY

According to an aspect of the disclosure, a printing system is provided comprising a plurality of resources including idle and non-idle resources having a plurality of image marking engines and a user interface for inputting user determinable priority criteria for a first print job. All of the non-idle resources are assigned to the first print job when the first print job is the only print job; and, a resource fraction of the non-idle resources is assigned to the first print job when there is at least a second print job.

According to another aspect of the disclosure, a printing system is provided comprising a plurality of image marking engines and a user interface for inputting user determinable priority criteria for a first print job. The user determinable priority includes a resource fraction of non-idle resources being assigned to the print job. All of the non-idle resources are assigned to the first print job when the first print job is the only print job, and the resource fraction of the non-idle resources is assigned to the first print job when there is at least a second print job.

According to still another aspect of the disclosure, a printing method is provided comprising inputting a user determinable priority for a first print job, and assigning a resource fraction of non-idle resources to the first print job from the user determinable priority. The non-idle resources include at least two image marking engines. Assigning all of the non-idle resources includes at least two image marking engines to the first print job when the first print job is the only print job; and, wherein assigning the resource fraction of the non-idle resources to the first print job when there is at least a second print job.

BRIEF DESCRIPTION OF THE DRAWINGS

FIG. 1 is flow chart outlining the resource partitioning print system.

DETAILED DESCRIPTION

The present disclosure provides for an added option to a graphic user interface (GUI) to make an individual job or queue run in "background priority" or a determinable priority 12. Optionally, an operator can assign a fraction (k) of non-idle resources to that job or queue (the default value of (k) being 0) 14. From the operator's perspective, the identified job now obtains all the resources 18 when there is no other job waiting to run, and obtains (k) of the resources 20 when there is at least one other job waiting to be run (or running) 16. The system is informed that the job is running as a background job, and its allocated (k) resource fraction 20. The supervisor sends the job to a separate splitter 23, and tracks whether there is at least one other job in the system 24. When there is another job in the system 26, the supervisor only assigns k of the total available RIP resources to the background job. This generalizes to the multiple independent streams case, allowing full use of all resources for any one stream if the other streams are idle and fair allocation of resources when more than one stream is active.

In an alternative embodiment, the operator can assign symbolic priorities, e.g. "high", "medium" and "low" 12. The system, in a pre-established manner, can automatically assign fractions of available resources that respect the assigned priority settings 20. Thus, if all jobs have the same priority, the system assigns each job 1/J of the resources, where there are J jobs. If there is a mixture of priorities, the system could, for example, assign 9/T to each of the "high" priority jobs; 3/T to each of the "medium" priority jobs; and 1/T to each of the "low" priority jobs, where T is the sum of 9 times the number of high priority jobs, 3 times the number of medium jobs and 1 times the number of low priority jobs. It is to be appreciated that other weighting factors and priorities are possible.

One exemplary arrangement of a multiple page parallel RIP system will be described hereinafter. In a page parallel RIP system, jobs can be sent to, for example, a DocuSP/FreeFlow spooling mechanism, which can include such features as saving (non-streaming) jobs to disk (for recovery), guessing the language, and extracting job ticket information. A description of the job is passed through various mechanisms to the page parallel RIP supervisor (PPR supervisor), which passes it on to a splitter. In some current systems there can be at least two splitters per language, one for interrupt jobs, and the other for normal jobs. While the system supports more than two splitters, only two per language are started.

The supervisor is aware of all of the parallel RIP processes available, and can assign chunks of the job to the available RIPs 30. In steady state, the supervisor maintains a model of the time to complete a chunk based on past experience with each of the RIP nodes (which need not be homogeneous), and various chunk characteristics determined by the splitter and passed to the supervisor. The supervisor assigns chunks to the various RIPs, by sending messages to the splitter, informing it of the chunk destinations, and the splitters then write the chunks of the file directly to the RIPs' file systems and/or memory. To keep the RIPs from needing to wait (or to minimize wait), the supervisor generally assigns chunks before the RIPs are idle, allowing each of them to accumulate a small (1-3 chunk) queue of unstarted work. To keep the splitter from needing to wait, the supervisor can allow the splitter to accumulate a small queue of unstarted work, as well. The queues are kept short so as to keep the estimates of time to completion from being too far off.

As RIPs complete chunks 32, they can send messages to the supervisor, which forwards them to the collector 34 (the collector can be implemented as a separate process, but could be a separate thread within the supervisor). The collector maintains a queue of completed chunks for each job, and then reports back completed chunks in the order of job submission, and then page order.

The size of a chunk can be controlled by configuration variables: a chunk is complete at the end of the next page after one of two thresholds is reached—either the number of pages or the number of Mbytes in the chunk exceeds a specified threshold.

For illustrative purposes, a typical operation of a system will be described hereinafter with an assumed chunk size of 3 pages and 100 Mbytes. The operation can begin with three jobs in the system, including page sizes and RIP times as given in Table 1, and split times (in some units) per page equal to the size in Mbytes.

TABLE 1

| Page | Size | Job 1 RIP time | size | Job 2 RIP time | size | Job 3 RIP time |
|---|---|---|---|---|---|---|
| 1 | 11 | 118.30 | 44 | 415.69 | 85 | 920.33 |
| 2 | 14 | 147.36 | 39 | 414.70 | 79 | 765.31 |
| 3 | 6 | 63.11 | 43 | 426.67 | 84 | 806.90 |
| 4 | 11 | 106.28 | 57 | 525.58 | 103 | 829.02 |
| 5 | 10 | 101.24 | 54 | 510.26 | 99 | 888.05 |
| 6 | 6 | 55.85 | 49 | 496.81 | 93 | 796.81 |
| 7 | 4 | 37.09 | 50 | 489.58 | 93 | 1049.28 |
| 8 | 11 | 115.72 | 59 | 615.51 | 105 | 998.4 |
| 9 | 8 | 59.15 | 54 | 555.99 | 99 | 1159.09 |
| 10 | 3 | 29.09 | 58 | 610.16 | 104 | 1063.30 |
| 11 | 9 | 83.65 | 57 | 671.55 | 103 | 1078.74 |
| 12 | 10 | 99.11 | 62 | 690.31 | 109 | 1186.40 |
| 13 | 5 | 48.61 | 63 | 523.20 | 111 | 1092.51 |

Table 2 shows the sequence of events, where each column after the first column shows which chunk is active on each RIP beginning at the time indicated in the first column. In the example below, chunks 1 through 5 are job one (1); chunks 6 through 11 are job two (2); and, chunks 12-19 are job three (3). Most of job one's chunks are three pages long (the exception being the last, single page, chunk). Job two's chunks average a bit over 2 pages, while job three's chunks average about 1.5 pages.

TABLE 2

| | RIP | | | |
|---|---|---|---|---|
| Time (t) | 1 | 2 | 3 | 4 |
| | | Active chunk | | |
| 0.00 | 1 | 2 | 3 | 4 |
| 272.95 | 1 | 2 | 5 | 4 |
| 294.86 | 1 | 2 | 5 | 6 |
| 301.37 | 1 | 7 | 5 | 6 |
| 321.57 | 1 | 7 | 8 | 6 |
| 339.76 | 9 | 7 | 8 | 6 |
| 1337.22 | 9 | 10 | 8 | 6 |
| 1505.91 | 11 | 10 | 8 | 6 |
| 1551.93 | 11 | 10 | 8 | 12 |
| 1923.47 | 11 | 10 | 13 | 12 |
| 2029.11 | 14 | 10 | 13 | 12 |
| 2699.07 | 14 | 15 | 13 | 12 |
| 2917.16 | 16 | 15 | 13 | 12 |
| 3237.56 | 16 | 15 | 13 | 17 |
| 3559.39 | 16 | 15 | 18 | 17 |
| 4545.16 | 16 | 19 | 18 | 17 |
| 4745.79 | 16 | 19 | | 17 |
| 5074.66 | | 19 | | 17 |
| 5379.60 | | 19 | | |

Referring to Table 2 above, at t=0, the first chunk is available, and it is assigned to RIP 1. Shortly thereafter, chunks 2, 3, and 4 are available, and assigned to RIPs 2, 3, and 4, respectively. Chunk 3 finishes first, and RIP 3 gets chunk 5 assigned to it. Chunk 4 finishes second, and RIP 4 gets chunk 6. At this point, jobs 1 and 2 are running concurrently. Chunk 2 finishes next, and RIP 2 gets chunk 7. Finally chunk 1 finishes, and now job 1 is complete. Processing continues in this fashion until there are no chunks left.

The above scenario utilizes estimation of RIP times, and provides a near-optimal sequence, in the sense that each job is finished nearly as soon as possible. (Note that finding the perfect sequence, in general, is N-P complete, since it can be transformed to the bin-packing problem). Also, latency is small since only a small amount of look—ahead is used for planning.

In the ideal case, every job is printed in the order of submission, in 1-N page sequence. It is user-selectable whether pages are printed in order from first to last (1-N) or in reverse order (N-1). Also, in the ideal case, the system is sized so that after a few chunks have been RiPped—actually after the first (sequentially) few chunks have been RIPped, regardless of which later chunks may have been RIPped before them—the printer may start, and the RIP system will never fall behind. Finally, the system accepts PostScript, and can utilize Document Structuring Conventions (DSC) comments to know where to split pages. While the majority of modern PostScript creation software produces adequately conformant PostScript, there are those jobs that fail to split (due to recognized non-conformance) or fault when split. These jobs revert to serial mode.

It is to be appreciated that the aforementioned system does not necessarily process jobs in order of submission. For illustration purposes, the three jobs in the example described above are relatively short. In the case of one very long (e.g. several thousand chunk) job, and perhaps a dozen short ones submitted after it, none of the short jobs begin to RIP until the long one is nearly done. If the long job is N-1, the printer doesn't start until after the long job is complete; albeit, the printer could have started if it could work on the short jobs at the same time.

The ability to send background priority jobs can be applicable to all systems having a page parallel RIP system, regardless of the number and/or types of print engines, or image marking engines, attached to them. The priority of the jobs can be associated and assigned based on the demands and capabilities of the printers. For example, the printing system can include printers of different speeds, e.g. printers where at least one is black and white and at least one is color. In this scenario, one printer might consume pages faster than the other, and the difficulty of the pages being run on one printer might be inherently different from the difficulty on the other. For example, one arrangement may have a printer with 100 PPM black and white and another with 60 PPM continuous tone color. If color jobs typically are 5 times slower than black and white jobs, the color machine would need 5×60% of the resource allocation that the black and white machine needs, or 3× the resources, meaning 75% of the total resources, the black and white machine getting 25% (numbers for ease of calculation in the illustration only).

The assignment of jobs can also account for printers with tighter real-time constraints, e.g. prioritized higher, subject to not starving other printer(s). Assignments can also automatically give priority to serial jobs. It is to be appreciated that resource allocation comprises providing RIPs to chunks in proportion to the resource allocation of the jobs to which the chunks belong. Wherein providing RIPs to chunks in proportion to the resource allocation of the job includes estimating the work required by each chunk and allocating work in accordance with the resource allocation.

With all of the foregoing in mind, the present disclosure and method allows operators to send some number (possibly as few as one, or as many as NRIPs−1) of jobs in "background priority". NRIPs is a system variable, or system determinable, component comprising 'N' number of RIPs. The "background priority" would also have (k) percent resources assigned by the user/operator.

The PPR supervisor, on receipt of a background priority job, would assign it to an appropriate splitter. Inactive splitters consume few resources, so having extra splitters available for this purpose has minimal impact. The supervisor would note that the job has a resource limit, which it respects when there are any other jobs in flight. The supervisor already has the means to control which job(s) are starved for resources by the rate at which it supplies chunk destinations to the splitter (s). The simplest means of balancing is by assigning chunks to that splitter in proportion to that job's percent resources limit. Since the supervisor also computes an approximation of the work associated with a chunk, it could instead assign the chunks based on the estimated work.

The current system enforces a requirement that jobs are reported as complete in the order in which they were submitted. This requirement would be relaxed when background priority jobs are in the system—a background priority job may be completed at any time, and any number of non-background jobs may complete ahead of it, regardless of when they were submitted. This enforcement is done by the collector. If the collector is aware that a job has background priority, it can allow other jobs whose chunks complete to report complete ahead of it. No chunk of a background priority job is reported complete until that job is either complete, or so close to complete that no non-background job can complete substantially ahead of it. In this way, other jobs continue to flow through the system regardless of background jobs.

An additional feature, is to have either user-selectable or default serial jobs automatically run in background priority, with a percent resources equal to one RIP. Because such a job runs as a single chunk, the supervisor already is free to run additional jobs in parallel with serial jobs, however in the prior behaviour, the additional jobs cannot report complete, nor can they print, until the serial job is complete.

Background priority can be settable on a queue basis or on a job basis. The operator has the ability to change the background priority of a job even while the job is in RIP, and the supervisor would be notified. That way, an N−1 job that takes all morning to RIP could get going, and then once a backlog of other jobs begins to develop, the operator could switch that job to background priority as needed. Also, a slow 1-N job known to take all morning, for example, could be started in background priority, and any other jobs could be submitted and printed until mid-morning, at which point the operator could switch the background 'priority-ness' of the job off, and the job would by then have plenty of pages RiPped ahead such that it could keep up with the printer until the job is complete.

In a large system, there are various reasons why an operator might want to RIP multiple independent jobs in parallel, in addition to the background job case described above. For example, for reconfigurable dual engine systems, a desired feature of a print line comprising two continuous feed print engines is the ability to reconfigure the print line among at least two, possibly three of the following configurations: a) dual engine duplex—the first engine prints front sides and the second engine prints back sides of the same job; b) dual simplex—the two engines print separate independent jobs, and are attached to separate feeders and finishers; c) Moebius duplex—a single engine prints on half the width of its imagable area on the front side of a half-width roll, and the paper is fed back through the other side of the imagable area, twisted so that the back sides are printed on the second pass. In such a system, some of the time only one job is being printed, while at other times multiple jobs are being printed.

For dual job impositions, a single engine may be printing two (or more) jobs in parallel on different portions of the sheet/roll to be later cut. The system might be configured, for example, to have the left ten (10) inches act as one "virtual printer", and the remaining portion of the imagable area act as another.

A large scalable RIP system could be used to drive all the printers in a print shop, regardless of the number of printers involved. There might be only one queue active per printer, but it would desirable that none of the queues be starved for resources, albeit different printers may have different real-time requirements (e.g. some printers may be more amenable to starting and stopping without adverse effect than others).

With the foregoing in mind, one aspect of this disclosure is to enable parallel streams in a page parallel RIP system. In the embodiments described above, the user or operator is presented with a set of options. A print queue may be designated as operable as a parallel queue, along with other possible designations, such as which physical or virtual marking engine it is driving. When a queue is designated as operable as a parallel queue, its resource allocation is settable, either as a default, or by the operator. The natural default would be to divide all parallel queues evenly, or in proportion to the speeds of the print engines being driven by them. When one or more queues are inactive, the resources allocated to those queues would be apportioned to the remaining active queues. If the workload of the different queues turns out to be out of balance with the resource allocation, the queues with the lighter workload will become inactive more frequently, allowing the queues with the heavier workload to obtain more resources and catch up. This allows load balancing across queues without the possibility of starving any queue for resources.

Background jobs may be included with parallel streams. If a given queue is allocated (k) of the total resources, and a background job is assigned (l) of its queue's resources, then when all queues are active, that job will obtain (k)(l) of the resources. When only the given queue is active, the job will obtain (1) of the total resources, and when only the background job is active it will obtain all of the resources.

In yet another alternative embodiment, the system might be driving multiple printers wherein the system detects that one of the printers is much slower than the combined RIP resources being devoted to it. For example, the system could detect that it is only sending 1-N jobs to a certain printer, and that printer has some (reasonably large) number, such as 10 minutes worth, of pages prepared for it, but not yet printed. In such a case, it could reduce the priority of jobs going to that printer, until the number of pages ahead has dropped below some other threshold (such as 5 minutes worth), before increasing the priority again.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing method comprising:
   inputting a user determinable priority criteria for a first print job from a user interface;
   assigning all non-idle resources to said first print job when said first print job is the only print job;
   assigning a fraction of said non-idle resources to said first print job when there is at least a second print job;
   assigning all of said non-idle resources, less than said resource fraction, to said second print job; and
   printing the print data with at least one image marking engine;
   wherein said resources comprises a plurality of RIPs, said RIPs are operable in parallel,
   wherein assigning the fraction of said non-idle resources comprises providing a plurality of RIPs with chunks of print data in proportions;
   wherein the proportions includes an estimation of the work required by each chunk of print data and allocating the work,
   wherein a first chunk of print data is assigned to a first RIP and a second chunk of print data is assigned to a second RIP, and at least a third chunk of print data is assigned sequentially to the next available RIP, and
   wherein said user determinable priority is changeable for an already-running job from a first priority to a second priority.

2. The printing method of claim 1, wherein said user determinable priority includes said resource fraction of said non-idle resources is assigned to said first print job.

3. The printing method of claim 1, further comprising using queues for the at least said first print job and said second print job, wherein said user determinable priority is set on a queue basis.

4. The printing method of claim 1, wherein said user determinable priority is set on a job basis.

5. The printing method of claim 1, further comprising printing the print data with at least a second image marking engine, wherein said first print job and said at least second print job are processed simultaneously.

6. A printing method for printing print jobs for a plurality of image marking engines comprising the steps of:
   inputting a user determinable priority for a first print job;
   assigning a fraction of non-idle resources to said first print job based on said user determinable priority;
   assigning all of said non-idle resources to said first print job when said first print job is the only print job;
   assigning said fraction of said non-idle resources to said first print job when there is at least a second print job;
   assigning all of said non-idle resources, less than said resource fraction, to said second print job;
   wherein said resources comprise a plurality of RIPs, said RIPs are operable in parallel,
   wherein assigning said fraction of said non-idle resources comprises providing a plurality of RIPs with chunks of print data in proportions,
   wherein the proportions includes an estimation of the work required by each said chunk of print data and allocating the work,
   wherein a first chunk of print data is assigned to a first RIP and a second chunk of print data is assigned to a second RIP, and at least a third chunk of print data is assigned sequentially to the next available RIP,
   wherein said user determinable priority is changeable for an already-running job from a first priority to a second priority, and
   wherein the steps are executed by a processor.

7. The printing method of claim 6, wherein said first print job and said at least second print job are processed simultaneously on said non-idle resources that includes at least two image marking engines, and wherein one image marking engine is different than the other image marking engine.

8. The printing method of claim 6, wherein said one image marking engine and said other image marking engine each include a capability, and wherein said priority is based on each said capability.

9. The printing method of claim 6, wherein processing said first and second print jobs includes performing raster image processing on the print data of said first and second print jobs.

10. The printing method of claim 6, wherein said all of said non-idle resources, less than said resource fraction, is assigned to said second print job.

11. A printing method for printing print jobs for a plurality of image marking engines comprising:
    assigning a fraction of non-idle resources to a first print job;
    assigning all of said non-idle resources to said first print job when said first print job is the only print job;
    assigning said fraction of said non-idle resources to said first print job when there is at least a second print job;
    printing said first print job with a first printing engine, and printing said second print job with a second printing engine;
    detecting, during printing of said first print job and said second print job, that said first print job is ahead of said first printing engine by more than some threshold, and automatically reducing the priority of said first print job;
    wherein assigning said fraction of said non-idle resources comprises providing a plurality of RIPs with chunks of print data in proportions,
    wherein the proportions includes an estimation of the work required by each said chunk of print data and allocating the work,
    wherein said resources comprise a plurality of RIPs, said RIPs are operable in parallel, and
    wherein a first chunk of print data is assigned to a first RIP and a second chunk of print data is assigned to a second RIP, and at least a third chunk of print data is assigned sequentially to the next available RIP.

12. The printing method of claim 11, further comprising:
    printing said first print job on a first printing engine, and printing said second print job on a second printing engine; and assigning said fraction comprises assigning said non-idle resources in accordance with printing speeds of said first and second printing engines.

13. The printing method of claim 11, further comprising detecting that said first print job is to be processed in serial, and assigning said fraction to said first print job equivalent to one RIP.

14. The printing method of claim 11, further comprising detecting that said first print job is ahead of said printing engine by less than some threshold, and automatically increasing the priority of said first print job.

15. The printing method of claim 11, further comprising wherein assigning said fraction comprises assigning said resources in accordance with values provided through a user interface.

* * * * *